July 27, 1948.  H. A. GOLLMAR  2,445,825
PROCESS FOR THE RECOVERY OF PHENOLS
Filed May 3, 1944
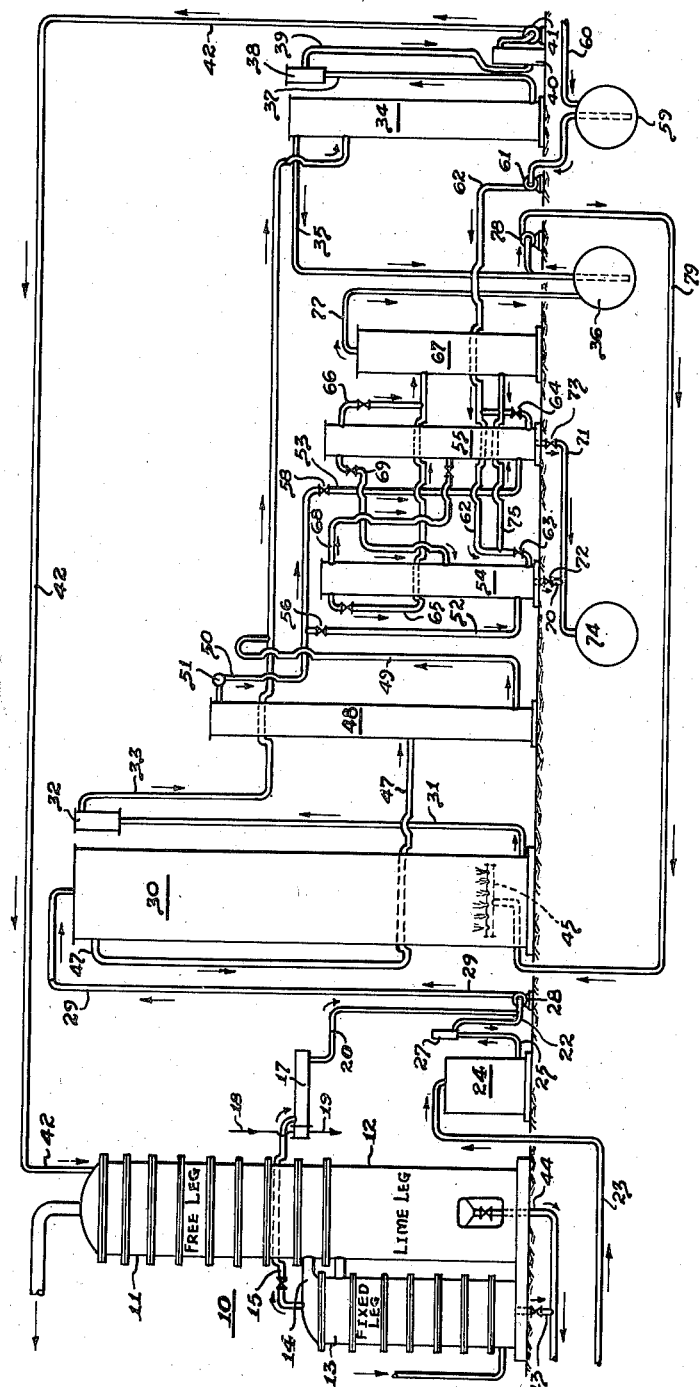
INVENTOR.
HERBERT A. GOLLMAR.
BY Edmund G. Horkey
his ATTORNEY.

Patented July 27, 1948

2,445,825

UNITED STATES PATENT OFFICE 2,445,825

PROCESS FOR THE RECOVERY OF PHENOLS

Herbert A. Gollmar, Mount Lebanon, Pa., assignor, by mesne assignments, to Koppers Company, Incorporated, Pittsburgh, Pa., a corporation of Delaware Application May 3, 1944, Serial No. 533,983

4 Claims. (Cl. 260—627)

The present invention relates to the recovery of phenols from aqueous solutions of the same and divers compounds by extraction with an organic solvent. The invention is especially applicable to a method of dephenolizing the ammonia liquor of a by-product coke plant by extracting tar acids, and particularly phenol, from the liquor with an organic solvent such as benzol, or the like, and has reference more particularly, therefore, to improvements in such dephenolization method whereby more economical and more efficient recovery is obtained.

The ammonia liquor of a by-product coke plant contains besides ammonia and phenol certain ammonia salts and other compounds including hydrogen sulphide. When ammonia liquor is treated with an extracting-solvent, for example benzol, some of this hydrogen sulphide is dissolved in the solvent, and carries through the process to contaminate the phenol product and form odoriferous and objectionable compounds therewith. The phenolized solvent is usually treated with caustic alkali to separate the phenol therefrom, in which case the hydrogen sulphide reacts with the caustic and thus wastes considerable quantities of the caustic. The alkali sulphides formed accumulate and eventually interfere with re-use of the solvent.

The desirability of removing hydrogen sulphide and like contaminants from the phenolized extractant has therefore for some time been recognized. Accomplishment of such an object has encountered the obstacle of incurring loss of phenol in mediums intended to remove solely the contaminants, as for example, is the case when water is employed for extraction of the hydrogen sulphide contaminant, phenol also being soluble in water. Furthermore, the cost of introducing additional steps and equipment therefor into the process must be borne by the recovered phenol.

The present invention has for one object therefore the provision of a process of dephenolization whereby contamination of the extractant is avoided and hence no purification of the extractant is needed before it may be reused in the process.

Another and primary object of the present invention is the provision of an improved method for the more economical dephenolization of solution containing phenol and the recovery of the latter in an improved state of purity.

The invention has for further objects such other improvements and such other operative advantages or results as may be found to obtain in the processes or apparatus hereinafter described or claimed.

Briefly stated, the present invention consists in increasing the ammonium hydroxide content of ammonia liquors by, for example, fortifying the same by addition thereto of condensate of ammonia-still vapors. The added ammonia tends to fix the hydrogen sulphide and like contaminants in the said ammonia liquor, so that, when it is treated with an organic solvent, such as benzol, for the extraction of the phenols thereof, phenols of relatively high purity and low content of contaminant will be absorbed into the benzol. By this means a beneficially decreased amount of caustic alkali is required for the separation of phenols from the benzol and the phenol product is substantially free of sulphur-phenol compounds of notoriously odoriferous character. The employed fortifying ammonia is returned to the ammonia still in the dephenolized ammonia liquor and consequently is not consumed as a reagent nor is it otherwise lost.

In the accompanying drawing forming a part of this specification and illustrating for purposes of exemplification a preferred apparatus and method in which the invention may be embodied and practiced but without limiting the claimed invention specifically to such illustrative instance or instances; the figure is a diagrammatic elevational view of apparatus for the dephenolization of ammonia liquor in accordance with the present invention.

Referring to the drawing, there is shown at the left thereof a by-product coke plant ammonia still 10 of conventional design and having a free leg 11, a lime leg 12, and a fixed leg 13, the first two of which comprise a single column. The usual vapor passage 14 is used for conveying vapors from the said fixed leg to the free leg. A relatively small valved pipe 15 is attached to the vapor dome of the fixed leg 13 for conducting a portion of the fixed-still vapors to an indirect water cooled condenser 17 having the conventional inlet and outlet cooling-water pipes respectively 18 and 19. The so-separated ammonia-still vapors are condensed in condenser 17 and the condensate is flowed in continuous stream through a pipe 20 to its juncture with a pipe 22 where the said condensate is mixed with coke-plant ammonia liquor.

The aforementioned ammonia liquor is flowed from its source in the coke-plant through a pipe 23 to a settling tank 24 wherein tar or like contaminants can be skimmed from the surface of the said liquor. Thence the clean liquor flows first through a leveling pipe 25 having an overflow device 27 by which a preferred level of ammonia liquor is maintained in the said tank 24. The clean ammonia liquor leaves the tank 24 through the pipe 22 and mixes with the aforementioned fixed-ammonia-still vapor condensate flowing through pipe 20. The mixed liquors therefore comprise a solution having an ammonia content which is the weighed average of the concentrations in the liquor and the condensate, and thus showing an increased concentration over that occurring in the original ammonia liquor.

The so-fortified ammonia liquor is then more thoroughly mixed by a centrifugal pump 28 and is pumped thereby through a pipe 29 into the top of dephenolizer tower 30, wherein it is distributed across the horizontal sectional area thereof by suitable means such as spray nozzles or a perforated pipe, not shown. In a preferred embodiment, and as shown, the ammonia liquor can be expelled beneath the surface of a liquid in the said tower.

The so-dispersed ammonia liquor descends within the tower in countercurrent flow and in intimate contact with ascending extractant fluid, for example benzol, and by such step, phenol is dissolved from the ammonia liquor so that upon reaching the bottom of the column, the descending ammonia liquor is substantially dephenolized. From the said tower 30 the so-dephenolized liquor rises in leveling pipe 31 to overflow device 32 from which it drains through pipe 33 into the midportion of settling tank 34. Herein any entrained organic solvent floats to the top of the said tank and is decanted therefrom through decanter pipe 35 to a solvent collecting tank 36.

The settled dephenolized ammonia liquor flows from the bottom of said settling tank 34 and rises through pipe 37 to overflow device 38, whence it flows through pipe 39 to surge tank 40.

The dephenolized ammonia liquor is thereafter pumped from the said surge tank 40 by a pump 41 through pipe 42 into the top of the free leg of the said ammonia still 10 wherein it is distilled in usual manner for recovery of its ammonia content. Waste liquor therefrom, which has been stripped of its ammonia content and which, by virtue of the described method of invention, has a beneficially low content of phenol, is drained through valved pipes 43 and 44 to sewage disposal means.

The solvent for extraction of phenols from the ammonia liquor enters the dephenolizing tower at the base thereof and is distributed by any means such as a perforated pipe 45 across the horizontal sectional area of the said tower. The ascending solvent extracts phenols from the ammonia liquor with which it flows in countercurrent direction and intimate contact. At the top of the column of liquids the so-phenolized solvent floats above the inflowing ammonia liquor and is decanted from the said tower through a pipe 47. The phenolized solvent is transferred by said pipe 47 to a settling tank 48 which is ordinarily kept full and which permits a settling out of entrained ammonia liquor from the phenolized solvent. Settled-out ammonia liquor rises through pipe 49 and joins the flow of dephenolized ammonia liquor through the pipe 33 at the juncture of the said pipe 49 therewith.

Phenolized solvent from the settling tank 48 overflows through pipe 50 having a sight flow 51 and through either pipe 52 or 53 or both into the base of either one or both of two caustic tanks 54 and 55, depending on whether valves 56 and 58 in the said pipes 52 and 53 respectively are open or closed.

At the beginning of operation the aforementioned caustic tanks 54 and 55 are filled with aqueous caustic solution, for example, sodium hydroxide solution, from a storage tank 59 having a supplying line 60. The caustic solution is pumped to the said caustic tanks by a pump 61 that is disposed in the valved caustic line 62 which is arranged to deliver caustic solution to the base of either tank 54 or 55 by the operation of the valves respectively 63 and 64. Within the tower the caustic reacts with the phenol in the phenolized solvent and forms alkali phenate which dissolves into the caustic solution.

The connections between the caustic lines and the caustic tanks permit their operation either in parallel or in series. Thus, when both caustic tanks contain fresh charges of caustic solution, they may be operated in parallel and dephenolized solvent can be decanted through each of the tanks 54 and 55 through respectively valved pipes 65 and 66, the latter of which joins the former, and be flowed into a caustic settling tank 67. Or if one tank contains an appreciable content of alkali phenate and the other tank is fresh, they can be operated in appropriate order by suitable operation of the valved decanter pipes 68 and 69 and of the aforementioned pipes 64 and 65 so that partially dephenolized solvent will always be treated with fresh caustic solution.

When the caustic solution in a tank attains a preferred concentration of alkali phenate, phenolized solvent is no longer flowed thereinto and the alkali-phenate caustic solution is drained through drain pipes 70 or 71 by the opening of respectively valves 72 or 73 into an alkali phenate storage tank 74. Usually the alkali phenate solution is concentrated by evaporators within the plant and thereafter the concentrated solution is shipped to plants where the phenol is released from combination with the alkali by treatment, for example, with acids or acid gases, and by subsequent separation by decantation. An agent often employed for this purpose is carbon dioxide that forms sodium carbonate in solution and releases from combination the phenol, which rises to the top of the sodium carbonate solution with which it is immiscible. The immiscible liquids are separated and the sodium carbonate solution is generally recausticized by the known lime reaction. Any hydrogen sulphide absorbed from the ammonia liquor and retained in the caustic as sodium sulphide can not be recausticized and therefore causes loss of caustic and, eventually, the increased sodium sulphide concentration interferes with the use of the solution. The reduction in hydrogen sulphide absorption that is provided by the method of invention minimizes the described ill effects.

Entrained caustic solution settles out of the dephenolized solvent in the said caustic settling tank 67. So-separated caustic solution is returned through pipe 75, which connects with caustic pipe 62, to either of the caustic tanks 54 or 55. The solvent from which entrained caustic has been separated is then siphoned through a pipe 77 into aforementioned dephenolized solvent collecting tank 36, whence it is recycled by a pump 78 through a pipe 79 to the base of the dephenolizer 30.

For purposes of simplification and clarity, more elaborate apparatus well known to the art, for ensuring, for example, the effective separation of immiscible liquids from one another, are not shown or described herein, although such apparatus may be employable with equivalent success in operation of the method of the present invention.

In an example of operation of the process of invention, a coke-plant ammonia having the following analysis was treated for removal of its phenol content:

Ammonia present as NH4OH, grams per liter NH3 _____ 3.580
Ammonia present as NH4HCO3, grams per liter NH3 _____ 0.855
Ammonia present as NH4HS, grams per liter NH3 _____ 0.645
Ammonia present as NH4Cl and other salts, grams per liter NH3 _____ 3.11
Total ammonia, grams per liter NH3 _____ 8.19

Ammonia in an amount equivalent to one-third of the total ammonia originally present in the liquor was added to the described ammonia liquor, thereby to provide a solution containing approximately 10.82 grams per liter of ammonia reported as NH3. The so-fortified ammonia liquor was scrubbed with benzol and an unfortified portion of the said coke-plant liquor was treated in the same manner. The benzol after being employed in scrubbing the unfortified portion contained 0.0187 gram per liter hydrogen sulphide, and the benzol employed in scrubbing the previously fortified portion contained 0.0106 gram per liter hydrogen sulphide. A reduction, therefore, of 43.3% in the hydrogen sulphide content was obtained.

It was found that greater reduction in amount of hydrogen sulphide absorbed by the benzol could be obtained by further increasing the free ammonia content of the treated ammonia liquor to the limit of a maximum practical ratio which was found to be about five parts of ammonia as ammonium hydroxide to one part of the ammonia fixed as salts in the said ammonia liquor; such further increase in the said ratio within the defined limit does not seriously impede the absorption of phenol by the benzol extractant, the buffering action of the ionized ammonium salts being sufficient, within the limiting ratio, to avoid too great a proportion of the phenol being fixed as phenate. The said 43.3% reduction in hydrogen sulphide absorbed by benzol obtaining in the hereinabove given example is the result of an ammonium hydroxide to ammonium salt ratio low enough that the phenol was readily absorbed in the said benzol and nevertheless high enough that the absorbed hydrogen sulphide was of sufficiently low concentration that a greatly improved phenol was obtained. A further removal of hydrogen sulphide from phenol is accomplished by the sweeping action of the acid gas employed in releasing the extracted phenol from its solution in caustic soda. Thus, by the described ammonia-fortifying step of the invention, a final phenol product is obtained which has a relatively low content of hydrogen sulphide, or compounds thereof.

It was further found in the development of the present invention that, when treating a typical ammonia liquor containing about one-half a mole per liter of total ammonia, or a dilute ammonia liquor containing only about one-tenth mole per liter of ammonia as ammonium salts, a minimum increase in the ratio of free to fixed ammonia from 0.32 to a ratio of 0.42 or, in other words, to a minimum content of ammonia as ammonium hydroxide of approximately one-twentieth mol per liter will provide beneficial results.

The invention as hereinabove set forth is embodied in particular form and manner but may be variously embodied within the scope of the claims hereinafter made.

I claim:

1. In a process for the dephenolization of coke-plant ammonia liquor containing hydrogen sulphide and ammonium salts, and for the recovery of phenols therefrom, consisting in the extraction of the phenols with benzol as a solvent, scrubbing the phenolized solvent with caustic solution, liberating the phenols from the caustic solution with acid reagent, and separating the so-freed phenols, the step of: dissolving ammonia in the said ammonia liquor to increase the ratio of ammonia as ammonium hydroxide to ammonia as ammonium salts by at least one-tenth of a unit and to a minimum ratio of 0.42 and to at most a maximum ratio of five to one.

2. A process for the extraction of phenols from coke-plant ammonia liquor containing phenols, hydrogen sulfide and a concentration of ammonia as ammonium salts of at least one-tenth mole per liter, said process comprising: dissolving sufficient ammonia in said liquor to provide a ratio of ammonia as ammonium hydroxide to ammonia as ammonium salts of at least 0.42, the ratio being increased by the ammonia addition a minimum of one-tenth of a unit which increases the resistance of the hydrogen sulfide to absorption while the said liquor is being extracted with benzol as a solvent; scrubbing the ammoniated liquor with the said solvent to extract phenols; scrubbing the phenolized solvent with an aqueous caustic solution to form alkali phenate; and separating free phenols from the said caustic solution by treatment with an acidic reagent.

3. A process for the extraction of phenols from coke-plant ammonia liquor containing phenols together with hydrogen sulfide and a concentration of ammonia as ammonium salts of at least one-tenth mole per liter, said process comprising: dissolving sufficient ammonia in said liquor to provide a ratio of ammonia as ammonium hydroxide to ammonia as ammonium salts of at most a maximum ratio of five to one to form a fortified ammonium liquor having a total content of ammonium hydroxide of at least one-twentieth mole per liter thereby increasing the resistance of the hydrogen sulfide to absorption while the said liquor is being extracted with benzol as a solvent; scrubbing the ammoniated liquor with the said solvent to extract phenols; scrubbing the phenolized solvent with an aqueous caustic solution to form alkali phenate; and separating free phenols from the said caustic solution by treatment with an acidic reagent.

4. A process for the extraction of phenols from coke-plant ammonia liquor containing phenols together with hydrogen sulfide and a concentration of ammonia as ammonium salts of at least one-tenth mole per liter, said process comprising: dissolving sufficient ammonia in said liquor to provide a ratio of ammonia as ammonium hydroxide to ammonia as ammonium salts of at most a maximum ratio of five to one, said ammonia addition increasing the said ratio of the liquor at least one-tenth of a unit, thereby to increase the resistance of the hydrogen sulfide to absorption while the said liquor is being extracted with benzol as a solvent; scrubbing the ammoniated liquor with the said solvent to extract phenols; scrubbing the phenolized solvent with an aqueous caustic solution to form alkali phenate; and separating free phenols from the said caustic solution by treatment with an acidic reagent.

HERBERT A. GOLLMAR.

REFERENCES CITED

The following references are of record in the file of this patent:

UNITED STATES PATENTS

| Number | Name | Date |
|---|---|---|
| 1,595,603 | Heffner | Aug. 10, 1926 |
| 1,957,295 | Shaw | May 1, 1934 |
| 2,056,063 | Bragg | Sept. 29, 1936 |
| 2,127,503 | Denig | Aug. 23, 1938 |
| 2,184,928 | Luten | Dec. 26, 1939 |